(12) United States Patent
Salin et al.

(10) Patent No.: US 10,027,905 B2
(45) Date of Patent: Jul. 17, 2018

(54) METHOD AND APPARATUS FOR DYNAMIC IMAGE CONTENT MANIPULATION

(71) Applicant: Supponor Oy, Espoo (FI)

(72) Inventors: Markku Salin, Espoo (FI); Vesa Suontama, London (GB)

(73) Assignee: SUPPONOR OY, Espoo (FI)

( * ) Notice: Subject to any disclaimer, the term of this patent is extended or adjusted under 35 U.S.C. 154(b) by 0 days.

(21) Appl. No.: 15/503,048

(22) PCT Filed: Aug. 12, 2015

(86) PCT No.: PCT/EP2015/068576
§ 371 (c)(1),
(2) Date: Feb. 10, 2017

(87) PCT Pub. No.: WO2016/023953
PCT Pub. Date: Feb. 18, 2016

(65) Prior Publication Data
US 2017/0237910 A1  Aug. 17, 2017

(30) Foreign Application Priority Data
Aug. 12, 2014 (GB) .................................. 1414269.9

(51) Int. Cl.
G09G 5/00 (2006.01)
H04N 5/272 (2006.01)
G09G 5/377 (2006.01)
G06T 11/60 (2006.01)

(52) U.S. Cl.
CPC ............ *H04N 5/2723* (2013.01); *G06T 11/60* (2013.01); *G09G 5/377* (2013.01); *G09G 2340/12* (2013.01)

(58) Field of Classification Search
CPC ...... H04N 5/2723; G06T 11/60; G09G 5/377; G09G 2340/12
See application file for complete search history.

(56) References Cited

U.S. PATENT DOCUMENTS

| 5,892,554 A | 4/1999 | DiCicco et al. |
| 6,181,345 B1 | 1/2001 | Richard |
| 2001/0026319 A1 | 10/2001 | Honey et al. |
| 2003/0012409 A1 | 1/2003 | Overton et al. |

FOREIGN PATENT DOCUMENTS

| EP | 2360644 A2 | 8/2011 |
| GB | 2501172 A | 10/2013 |
| GB | 2502986 A | 12/2013 |
| WO | 9818261 A1 | 4/1998 |
| WO | 9846014 A1 | 10/1998 |
| WO | 0135641 A1 | 5/2001 |

*Primary Examiner* — Robert Craddock
(74) *Attorney, Agent, or Firm* — Murphy, Bilak & Homiller, PLLC

(57) ABSTRACT

A sample key signal frame (602) and/or a sample image frame (601) may be stored showing a finely detailed element (101) at a first resolution (e.g. a zoomed-in image). A current image signal (71) includes the same finely-detailed element (101) at a second, lower, resolution (e.g. a wide-angle image). The sample (601, 602) is scaled and/or transformed to match a target area (10,14) within the current image (71), and may be used to perform an image enhancement process which enhances the detailed element (101) within an enhanced modified image frame (74). Thus, a more photo-realistic image is achieved.

8 Claims, 5 Drawing Sheets

METHOD AND APPARATUS FOR DYNAMIC IMAGE CONTENT MANIPULATION

RELATED CASES

The present application claims priority to GB1414269.9 filed on 12 Aug. 2014 in United Kingdom entitled "Method and Apparatus for Dynamic Image Content Manipulation", the entire content of which is incorporated herein by reference.

BACKGROUND

The present disclosure relates generally to a method and apparatus for manipulating the content of an image. More particularly, the present disclosure relates to a method and apparatus which detects a target area in one or more regions of an image, and which may replace the target area with alternate content. In some examples, the present disclosure relates to a dynamic image content replacement method and apparatus suitable for use with live television broadcasts.

In the related art, one or more target areas within a video image feed are defined and then replaced with alternate images appropriate to specific viewer groups or geographical regions. For example, billboards at a ground or arena of a major sporting event are observed as part of a television broadcast, and these target areas are electronically substituted by alternate images that are more appropriate for a particular country or region. In particular, such a system is useful to create multiple television feeds each having different electronically generated advertisement content which is tailored according to an intended audience (e.g. a billboard in the original images is modified to carry advert 1 for country 1, while advert 2 is added for region 2, and so on).

There is a difficulty in dynamically modifying the video image signals in a way which is accurate and photo-realistic for the viewer. Considering the related art, there is still a difficulty in providing a reliable and effective mechanism for defining a target area within a video image where content is to be replaced. Further, there is a need to improve a photorealistic impression of the altered images, so that ordinary viewers will not notice that image content replacement has taken place.

A particular difficulty arises in relation to images which contain fine details, such as a goal net in a football (soccer) match. These fine details are particularly difficult to handle accurately and consistently when inserting alternate content. That is, when appropriate cameras and detectors capture a scene of interest, these finely detailed elements may be poorly defined in some shots, such as a wide-angle or distance shots. A content replacement system may then insert alternate content without accurately representing these finely detailed elements. As a result, an alternate video feed may be less than ideal and the desired photo-realistic effect may not be achieved in some circumstances. Therefore, there is a desired to improve the visual appearance of images which are produced when inserting alternate content into a video image stream.

It is now desired to provide an apparatus and method which will address these, or other, limitations of the current art, as will be appreciated from the discussion and description herein.

SUMMARY

According to the present invention there is provided a method as set out in claim 1. Also according to the present invention there is provided an apparatus as set forth in claim 10. Other features of the present invention will be apparent from the dependent claims, and the description herein.

In one described example, a sample frame of a mask signal (or 'key' signal) may be stored in a preparation phase showing a finely-detailed element at a first resolution, such as a sample key signal frame in relation to a goal net with a zoomed-in shot at a first resolution. One example employs a respective pair of a sample key signal frame and a sample image frame of the same scene, which are suitably captured and stored in a first phase.

In one example, a current image signal includes the same finely-detailed element at a second, lower, resolution, such as showing the goal net now in a wide-angle shot. The sample frame is retrieved and may be scaled or transformed to match with a target area within the current image containing the detailed element. The sample frame may be used to perform an image enhancement process which enhances the detailed element to provide an enhanced modified image frame. Thus, a more photo-realistic image is achieved. The enhancement process may be applied frame by frame though a video sequence.

In one example there is described a method for use in dynamic image content manipulation, comprising: storing a sample key signal frame of a key signal which defines one or more pixel regions relating to a detailed element at a first resolution; receiving a current image frame which includes the detailed element shown at a second resolution within the current image frame, wherein the second resolution is lower in detail than the first resolution; providing a current key signal frame which defines a target area of the current image frame which is to be modified with an alternate content; modifying the current image frame with the alternate content in the target area; enhancing the detailed element in the current image frame by providing fill content in the one or more pixel regions defined by the sample key signal frame to provide an enhanced modified image frame in relation to the detailed element; and outputting the enhanced modified image frame.

One example includes transforming the sample key frame to correspond with a respective region of the current image frame containing the detailed element. One example includes distorting the sample key frame to correspond with a sub-region of the current image frame. In one example the distorting aligns a portion taken from the sample key frame as an irregular quadrilateral shape of the sub-region of the current image frame. In one example the transforming is applied proportional to a relative difference between a first camera measurement signal appropriate to the current image frame and a second camera measurement signal appropriate to the sample key frame.

One example includes storing a sample image frame corresponding to the sample key frame, and taking the fill content from the sample image frame in the pixel regions defined by the sample key signal frame. One example includes enhancing the detailed element of the current image frame only in the target area. One example includes overlaying the fill content according to a variable transparency factor.

One example includes selectively generating the enhanced modified image feed only at certain portions during an image stream appropriate to the presence of the detailed element in a received image feed while not providing the enhanced modified image feed at other portions during the image stream. The selectivity may be applied based on camera telemetry signals relating to the current image.

In one example there is described a dynamic image content manipulation system, comprising: a content replacement unit arranged to manipulate a received image feed; and a enhanced processing unit which is arranged to provide an enhanced modified image feed wherein the enhanced processing unit is arranged to: store a sample frame showing a detailed element at a first resolution; process a current image frame of the received image feed which includes the detailed element shown at a second resolution, wherein the second resolution is lower in detail than the first resolution; and enhance the detailed element in one or more pixel regions defined by the sample frame to provide an enhanced modified image frame.

In one example the enhanced processing unit is arranged to obtain the sample frame statically in advance of receiving the received image feed. In one example, the enhanced processing unit is arranged to obtain the sample frame contemporaneously with receiving the received image feed. In one example, the enhanced processing unit is arranged to obtain the sample frame opportunistically from the received image feed. In one example the enhanced processing unit is coupled to a camera and/or a detector which observes a scene including the detailed element to provide the sample frame.

In one example there is provided a tangible non-transient machine readable medium having recorded thereon instructions which when executed cause computer hardware to perform the steps of any of the methods defined herein.

BRIEF DESCRIPTION OF THE DRAWINGS

For a better understanding of the disclosure, and to show how embodiments of the same may be carried into effect, reference will now be made, by way of example, to the accompanying diagrammatic drawings in which.

DETAILED DESCRIPTION

The example embodiments will be described with reference to a content replacement system, or more generally an apparatus and method for image content manipulation, which may be used to replace content within television video images and particularly to provide photo-realistic replacement of a billboard for live television broadcasts. However, the methods and apparatus described herein may be applied in many other specific implementations, which may involve other forms of video images or relate to other subjects of interest, as will be apparent to persons skilled in the art from the teachings herein.

Figure 1:
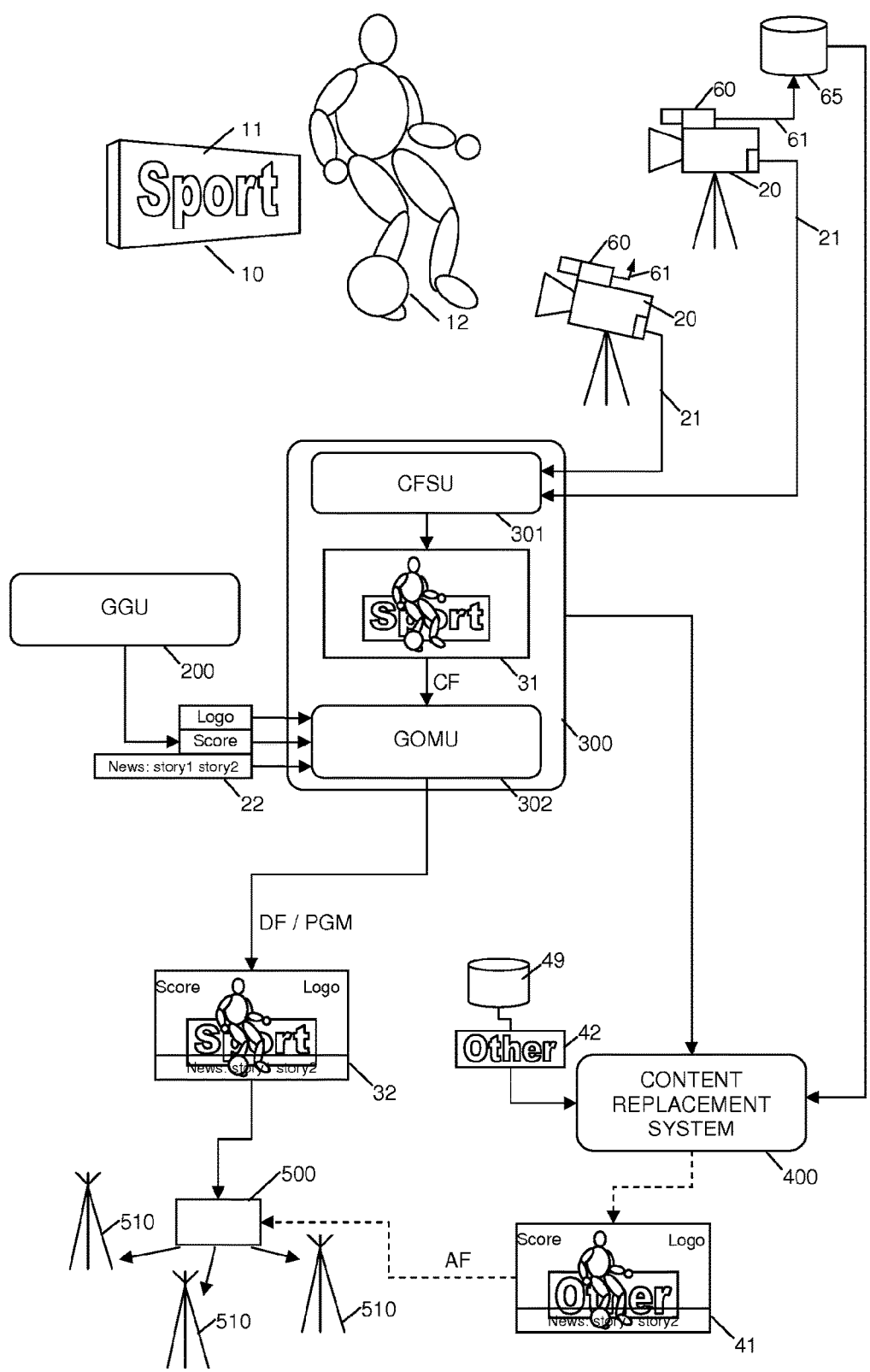
FIG. 1 is a schematic overview of a television broadcasting system in which example embodiments may be applied.

FIG. 1 is a schematic overview of a television broadcasting system in which example embodiments may be applied. FIG. 1 shows one or more observed subjects 10, one or more cameras 20, a vision mixing system 300, a content replacement system 400, and a broadcast delivery system 500. It will be appreciated that the system of FIG. 1 has been simplified for ease of explanation and that many other specific configurations will be available to persons skilled in the art.

In the illustrated embodiment, the observed subject of interest is a billboard 10 which carries original content 11 such as an advertisement (in this case the word "Sport"). The billboard 10 and the original content 11 are provided to be seen by persons in the vicinity. For example, many billboards are provided at a sporting stadium or arena visible to spectators present at the event. In one example, the billboards 10 are provided around a perimeter of a pitch so as to be prominent to spectators in the ground and also in video coverage of the event.

As shown in FIG. 1, one or more video cameras 20 observe the scene, along with one or more detectors 60 which are here shown separately for clarity. The cameras 20 produce video feeds of visible images. The detectors 60 meanwhile observe the same scene to derive a key signal (or mask signal) which allows the subject 10 to be accurately identified within the video images. In this example, the subject 10 may be partially obscured by finely detailed elements, such as a goal net in front of some of the perimeter advertising billboards in a soccer match.

Each television camera 20 observes a scene in a desired field of view to provide a respective camera feed 21. The field of view may change over time in order to track a scene of interest. The camera 20 may have a fixed location or may be movable (e.g. on a trackway) or may be mobile (e.g. a hand-held camera or gyroscopic stabilised camera). The camera 20 may have a fixed lens or zoom lens, and may have local pan and/or tilt motion. Typically, several cameras 20 are provided to cover the event or scene from different viewpoints, producing a corresponding plurality of camera feeds 21.

The billboard 10 may become obscured in the field of view of the camera 20 by an intervening object, such as by a ball, person or player 12. Thus, the camera feed 21 obtained by the camera 20 will encounter different conditions at different times during a particular event, such as (a) the subject billboard moving into or out of the field of view, (b) showing only part of the subject (c) the subject being obscured, wholly or partially, by an obstacle and/or (d) the observed subject being both partially observed and partially obscured. Hence, there is a difficulty in accurately determining the position of the desired subject 10 within the relevant video images, and so define a masking area or target area where the content within the video images is to be enhanced or modified, such as by being electronically replaced with alternate image content.

As shown in FIG. 1, the captured camera feeds 21 are provided, whether directly or indirectly via other equipment, to the vision mixing system 300, which in this example includes a camera feed selector unit CFSU 301 and a graphics overlay mixer unit GOMU 302. Typically, the vision mixer 300 is located in a professional television production environment such as a television studio, a cable broadcast facility, a commercial production facility, a remote truck or outside broadcast van ('OB van') or a linear video editing bay.

The vision mixer 300 is typically operated by a vision engineer to select amongst the camera feeds 21 at each point in time to produce a clean feed (CF) 31, also known as a director's cut clean feed. The vision mixing system 300 may incorporate or be coupled to a graphics generator unit GGU 200 which provides a plurality of graphics layers 22. As examples, the graphics layers 22 may include a station logo ("Logo"), a current score ("Score") and a pop-up or scrolling information bar ("News: story1 story2"). Typically, the one or more graphics layers 22 are applied successively over the clean feed 31 to produce a respective dirty feed (DF) 32. The dirty feed is also termed a program feed PGM as discussed above.

The graphics generator unit GGU 200 may be a separate stand-alone graphics computer system to produce the graphics layers 22, and/or the graphics layers 22 may be produced by components of the vision mixer 300. The graphics layers 22 may be semi-transparent and hence may overlap the observed billboard (subject) 10 in the video images. The graphics layers 22 may be dynamic, such as a moving logo, updating time or score information, or a moving information bar. Such dynamic graphics layers 22 give rise to further complexity in defining the desired masking area (target area) at each point in time.

The dirty feed DF 32 may be output to be transmitted as a broadcast feed, e.g. using a downstream broadcast delivery system 500. This feed may be broadcast live and/or is recorded for transmission later. The feed may be subject to one or more further image processing stages, or further mixing stages, in order to generate the relevant broadcast feed, as will be familiar to those skilled in the art. The broadcast delivery system 500 may distribute and deliver the broadcast feed in any suitable form including, for example, terrestrial, cable, satellite or Internet delivery mechanisms to any suitable media playback device including, for example, televisions, computers or hand-held devices. The broadcast feed may be broadcast to multiple viewers simultaneously, or may be transmitted to users individually, e.g. as video on demand.

The content replacement system 400 is arranged to identify relevant portions of video images corresponding to the observed subject 10 which is of interest. That is, the content replacement system 400 suitably performs a content detection function to identify one or more target areas or regions within the relevant video images which correspond to the subject 10. The content replacement system 400 may also suitably perform a content substitution function to selectively replace the identified portions with alternate content, to produce an alternate feed AF 41 which may then be broadcast as desired. In another example, the content substitution function may be performed later by a separate content substitution unit (also called a 'remote adder' or 'local inserter'). In which case, one or more of the signals discussed herein may be carried as an intermediate feed 35 ready to be used by the system at a later stage.

In more detail, the content replacement system 400 receives any suitable video image feed, and identifies therein a target area relevant to the subject of interest (in this case the billboard 10). The received images may then be modified so that the subject of interest 10 is replaced with the alternate content 42, to produce amended output images 41. In this illustrative example, a billboard 10, which originally displayed the word "Sport", now appears to display instead the alternate content 42, as illustrated by the word "Other". In this illustrative example, the content replacement system 400 is coupled to receive the incoming video images from the vision mixer 300 and to supply the amended video images as an alternate feed AF to the broadcast system 500, although other configurations are also envisaged as will be appreciated from the discussion herein.

In one example embodiment, the content replacement system 400 may be provided in combination with the vision mixer 300. As one example, the content replacement system 400 can be embodied as one or more software modules which execute using hardware of the vision mixer 300 or by using hardware associated therewith (e.g. an auxiliary board).

In another example embodiment, the content replacement system 400 may be provided as a separate and stand-alone piece of equipment, which is suitably coupled by appropriate wired or wireless communications channels to the other components of the system as discussed herein. In this case, the content replacement system 400 may be provided in the immediate vicinity of the vision mixer 300, or may be located remotely. The content replacement system 400 may receive video images directly from the vision mixer 300, or via one or more intermediate pieces of equipment. The input video images may be recorded and then processed by the content replacement system 400 later, and/or the output images may be recorded and provided to other equipment later.

In the example embodiments, a high value is achieved when images of a sporting event, such as a football or soccer match, are shown live to a large audience. The audience may be geographically diverse, e.g. worldwide, and hence it is desirable to create multiple different alternate broadcast feeds AF for supply to the broadcasting system 500 to be delivered in different territories using local delivery broadcast stations 510, e.g. country by country or region by region. In a live event, the content replacement system 400 should operate reliably and efficiently, and should cause minimal delay.

In the example embodiments, the alternate content 42 comprises one or more still images (e.g. JPEG image files) and/or one or more moving images (e.g. MPEG motion picture files). As another example, the alternate content 42 may comprise three-dimensional objects in a 3D interchange format, such as COLLADA, Wavefront .OBJ or Autodesk .3DS file formats, as will be familiar to those skilled in the art.

The alternate content 42 may be prepared in advance and may be recorded on a storage medium 49 coupled to the content replacement system 400. In another example, the alternate content 42 may be dynamically generated while the system is in use.

The content replacement system 400 produces one or more alternate feeds AF where the observed subject of interest, in this case the billboard 10, is modified, enhanced or replaced instead with the alternate content 42. Ideally, the images within the alternate feed AF should appear photo-realistic, in that the ordinary viewer normally would not notice that the subject 10 has been electronically modified. Hence, it is important to accurately determine a masking area defining the position of the billboard 10 within the video images input to the content replacement system 400. Also, it is important to identify accurately when portions of the observed subject 10 have been obscured by an intervening object 12 such as a player, referee, etc. Notably, the intervening object or objects may be fast-moving and may appear at different distances between the camera 20 and the subject 10. Further, it is desirable to produce the alternate feed 41 containing the alternate content 42 in a way which is agreeable for the viewer, and which is not noticeable or obtrusive. Also, latency and synchronisation may need to be considered, as well as accuracy of image content manipulation.

The example content replacement system 400 is arranged to process a plurality of detector signals 61. In one example embodiment, the detector signals 61 may be derived from the video images captured by the camera 20, e.g. using visible or near-visible light radiation capable of being captured optically through the camera 20, wherein the camera 20 acts as a detector 60. In another example embodiment, one or more detector units 60 are provided separate to the cameras 20.

In some examples, the detector signals 61 may be derived from any suitable wavelength radiation. The wavelengths may be visible or non-visible. In the following example embodiment, the detector signals 61 are derived from infra-red wavelengths, and the detector signals 61 are infra-red video signals representing an infra-red scene image. Another example embodiment may detect ultra-violet radiation. In one example embodiment, polarised visible or non-visible radiation may be detected. A combination of different wavelength groups may be used, such as a first detector signal derived from any one of infra-red, visible or ultra-violet wavelengths and a second detector signal derived from any one of infra-red, visible or ultra-violet wavelengths.

In the illustrated example embodiment, one or more detectors 60 are associated with the camera 20. In the example embodiment, each camera 20 is co-located with at least one detector 60. The or each such detector 60 may suitably survey a field of view which is at least partially consistent with the field of view of the camera 20 and so include the observed subject of interest 10. The detector field of view and the camera field of view may be correlated. Thus, the detector signals 61 are suitably correlated with the respective camera feed 21. In the example embodiment, the detector signals 61 are fed to the content replacement system 400. In the example embodiment, the detector signals 61 are relayed live to the content replacement system 400. In another example embodiment, the detector signals 61 may be recorded into a detector signal storage medium 65 to be replayed at the content replacement system 400 at a later time.

As an example, the one or more detectors 60 may be narrow-spectrum near infra-red (NIR) cameras. The detector 60 may be mounted adjacent to the camera 20 so as to have a field of view consistent with the camera 20. Further, in some embodiments, the detectors 60 may optionally share one or more optical components with the camera 20.

The detector 60 may be arranged to move with the camera 20, e.g. to follow the same pan & tilt motions. In the example embodiments, the cameras 20 may provide a telemetry signal which records relevant parameters of the camera, such as the focal length, aperture, motion and position. In one example, the telemetry signal includes pan and tilt information. The telemetry may also include zoom information or zoom information may be derived from analysing the moving images themselves. The telemetry may be used, directly or indirectly, to calculate or otherwise provide pan, roll, tilt and zoom (PRTZ) information. The camera telemetry signal may be passed to the content replacement system 400, whether directly or via an intermediate storage device, in order to provide additional information about the field of view being observed by each camera 20.

As noted above, a difficulty arises in manipulating images which contain fine details. In particular, one or more portions of the original scene may contain elements which are near to, or below, the resolution of the captured images. For example, certain elements may be at or near the resolution of one pixel in the captured images. These fine details are particularly difficult to handle accurately and consistently when inserting alternate content. That is, when the cameras 20 and detectors 60 capture the scene, these finely detailed elements may be poorly defined in some shots, such as a wide-angle or distance shots. Thus, the content replacement system 400 may insert the alternate content without accurately representing these finely detailed elements. As a result, the images of the alternate feed may be less than ideal and the desired photo-realistic effect may not be achieved in some circumstances. Therefore, there is a desired to improve the visual appearance of images which are produced when inserting alternate content into an image.

Figure 2:
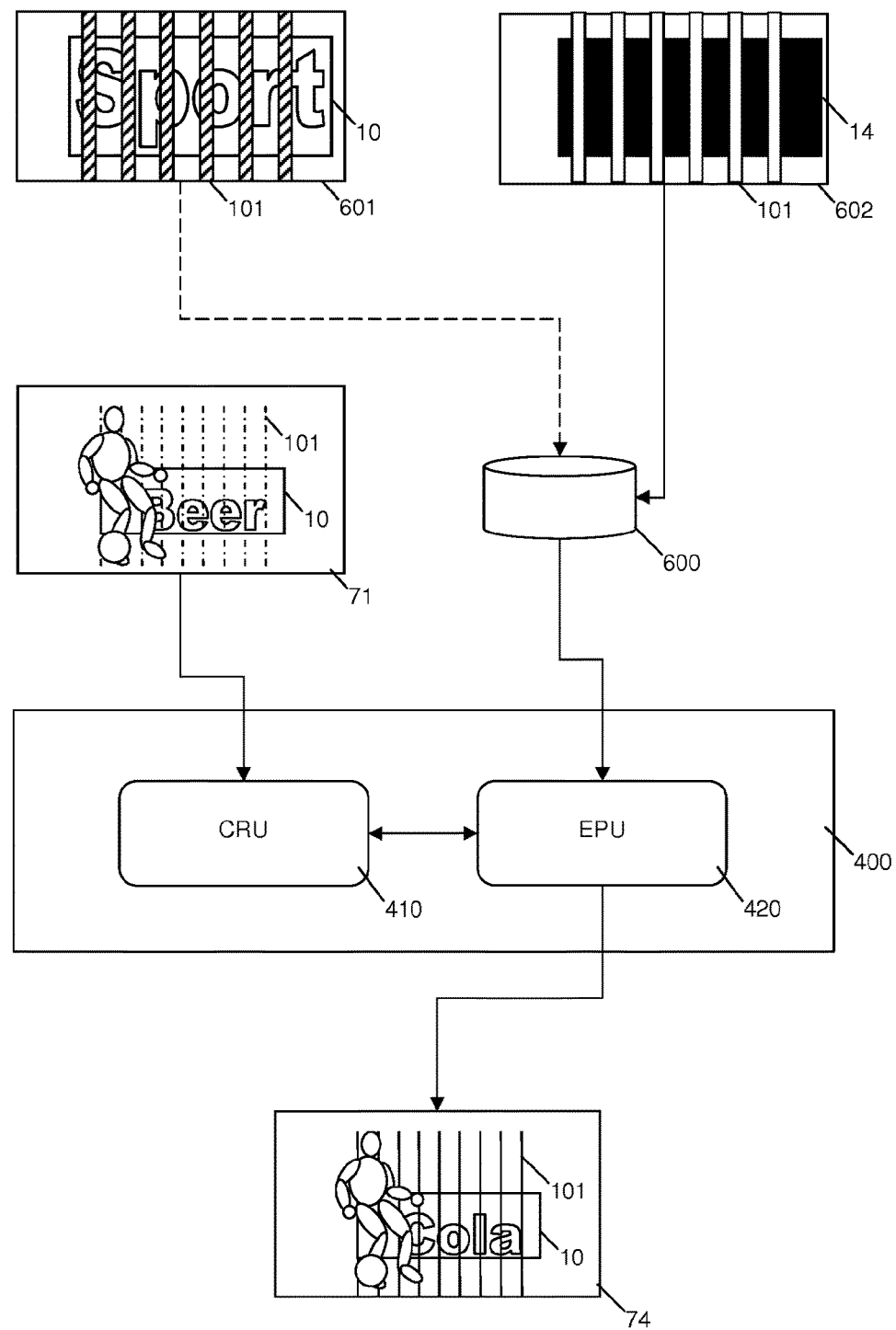
FIG. 2 is a schematic diagram of an example apparatus in more detail.

FIG. 2 shows a further example embodiment of the content replacement system. In this example, the system includes a content replacement unit CRU 410 which inserts alternate content into a received video image feed. The CRU 410 may operate in the manner already described above. Also, the system includes an enhanced processing unit EPU 420 which enhances a visual appearance of the alternate image feed provided from the CRU 410.

In a first phase, the EPU 420 is configured to obtain and store one or more sample frames, which may include sample images 601 of the scene including the one or more detailed elements 101 and/or one or more key signals 602 while observing the scene in relation to the detailed elements 101.

In one example, the EPU 420 may firstly obtain one or more sample frames 601, 602 of the detailed element 101 or feature which is of interest. In one example, the feature 101 is the goal and more particularly a goal net with a narrow filament structure, as illustrated by the solid vertical lines in FIG. 2. These sample frames 601, 602 are obtained at a first resolution level. Conveniently, the sample images 601 are obtained at a relatively high resolution, such that the feature 101 occupies multiple pixels within at least some of the sample frames 601, 602. In this example, the sample frames 601, 602 also include the subject 10 which is to be replaced with the alternate content. In this example, the subject 10 is a billboard showing the word "Sport". Of particular interest is the area where the detailed features 101 overlie the subject 10, e.g. the region where the goal net is in front of the billboard. Hence, only this relevant area (shown in black in the respective key signal frame 602) may be preserved and other areas may be deleted or ignored to save space. The sample image frames 601 and sample key frames 602 are suitably stored in an image repository 600, e.g. a hard disk drive.

Several such sample frames may be obtained, which may show the feature 101 at different times or in different conditions or configurations, so that a range of sample frames are available. A sequence of the sample frames 601/602 may be recorded as a short video sequence, e.g. to account for movements of the feature 101 like the goal net moving slightly.

In one example, the sample frames 601/602 may be obtained statically, in advance. In which case, the sample frames may be obtained under controlled conditions, such as choosing appropriate lighting or time of day and so on. For example, one or more of the cameras 20 and/or the detectors 60 may be used to zoom-in to observe and capture the sample frames 601/602 wherein the features 101 are shown in detail.

In one example, the sample frames 601/602 may be obtained contemporaneously with the video images upon which content replacement is to be performed. For example, the sample frames 601/602 may be recorded at convenient times during a live broadcast and then used later during that same broadcast or session. The sample frames 601/602 may be obtained opportunistically, by recording one or more segments of a video image feed, e.g. by recording appropriate portions of an image feed when the feature 101 happens to be shown in detail, as in a close-up or zoomed-in shot.

In one example, the sample frames 601/602 are obtained from any suitable one or more of the feeds or signals available to the CRU 410 as discussed above. In particular, the sample images 601 may originate from any of the cameras 20 at the venue which observe the scene, and likewise the sample key frames 602 may be derived from image signals provided by the detectors 60. In another example, a special camera/detector may be provided specifically to capture the sample frames 601/602. The special camera/detector (e.g. a 'goal net camera') may be a high-resolution camera or detector which is trained specifically on the features of interest.

As described above, the CRU 410 is arranged to generate the mask signal or target area key signal 602 which identifies the target area within the images which is to be replaced by the alternate content. In the first phase, the CRU 410 may be arranged to produce the target area key signal frames 602 in coordination with the sample images 601. The EPU 420 may hold the respective sample image frame 601 and key frame 602 together as a sample fill/key pair. In another example, the image signal and the key signal may be combined into a single stream, such as by using a 3-channel image representation (e.g. RBG or YUV) and a $4^{th}$-channel key representation (e.g. using the A channel of the RGBA or YUVA formats).

Figure 3:
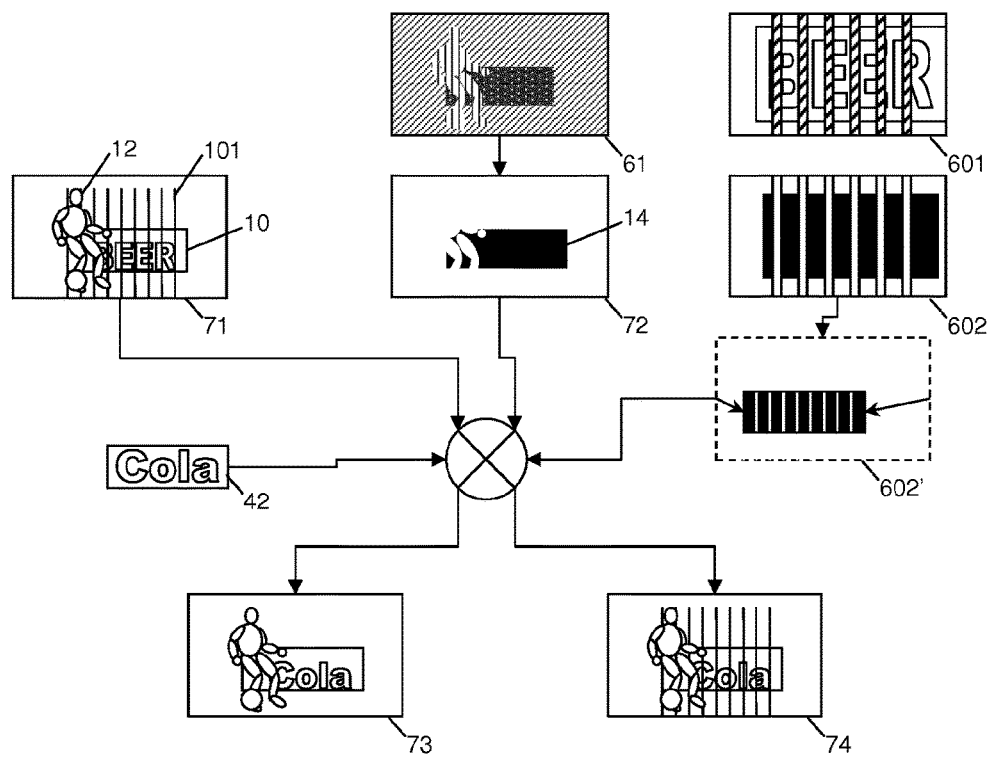
FIG. 3 is a schematic diagram of an example image enhancement function.

FIG. 3 further illustrates a second phase wherein the obtained sample frames 601/602 may be employed to enhance the images output by the content replacement system 400. As shown in FIG. 2 and again in more detail in FIG. 3, a current image frame 71 of a source video image signal is to be altered electronically by the content replacement system 400. In one example, the current frame 71 may be a live broadcast of a soccer match with perimeter advertising.

In this illustrative example, the subject 10 is a billboard with the word "BEER" whose image is to be replaced instead with the word "COLA" as the alternate content 42. Notably, the current image 71 shows one or more detailed features 101 which may be at or near the resolution of the image. Normally, such fine details are difficult to process by the system in this situation. Also, the current image 71 may comprise an occluding object 12 such as a player (e.g. a goalie) in front of the detailed features 101.

The finely detailed elements 101 may be represented inaccurately within the current image frame 71. For example, imperfections in optics or camera operation (e.g. focus errors) may render these fine details imperfectly in the current image 71. Also, factors such as motion blur may inhibit accurately determining the position of the fine details in the current image 71. Nevertheless, a complete absence of the fine details 101 in the altered images 73, 74 may be noticeable by the user. This presence or absence of fine details is more apparent when the viewer may compare different parts or sections of the image feed. For example, when the alternate content is introduced intermittently and the viewer at some times sees the original image feed and at other times sees the altered image feed, a distinction in quality between these images may be noticed by the viewer.

In one example, the detector signals 61 are processed to derive a corresponding current key signal frame 72, thus giving a current image/key frame pair 71/72 observing the scene. In one example, the detector signals 61 may be infra-red signals, and the key signal frame 72 may thus represent the scene using monochrome infra-red values. However, many other examples will be apparent to the skilled person and, for example, the key signal 72 may be derived from the visible images 71 (e.g. using chroma-keying). The detector signals 61 may, or may not, have the same resolution as the current image signal 71 and similar considerations apply in terms of focus errors, motion blur and so on which may degrade the ability of the key signal frame 72 to accurately define the fine details 101. The target key signal frame 72 defines a target region 14 (shown in black) to be modified. The fine details 101 may be just visible in the current frame 71, but typically are not present or are difficult to determine within the respective key signal frame 72. As a result, the key signal frame 72 may cause the content replacement process to operate sub-optimally in particular by failing to account for the fine details in the target area 14.

In this example, one or more appropriate sample frames 601/602 are selected from the first recording phase. Generally, the current image frame 71 and/or the current key frame 72 represents an object of interest at a second resolution which is not the same as the first resolution at which that same object is represented in the respective sample frames 601/602. In particular, the first resolution may be higher than the second resolution and thus the sample frames 601/602 show the object of interest with greater detail and precision than the current frames 71/72.

An image transformation may be applied to the selected sample frame 601/602. That is, the selected sample frame 601/602 is scaled, sized or otherwise manipulated appropriate to the target area 14 in the current frame 71/72, to provide a respective transformed sample frame 601'/602' ready to be used. The transformed sample frames 601'/602' may be selected from a sub-region of the previously stored frames 601/602, where appropriate. In one example, a perspective adjustment may be applied, wherein the sample frames 601/602 are adjusted to fit a perspective of the current frame 71/72. In one example, a rectangular region from the sample frame 601/602 may be transformed or distorted to become an irregular quadrilateral region 601'/602' ready to be applied onto the region of interest in the current frame 71/72. In one example, the stored sample frame 601/602 may be tessellated into a plurality of sub-regions. Each sub-region is projected according to a mathematical model representing camera lens distortion appropriate to that part of the frame, leading to an appropriately transformed image region in the transformed frame 601'/602'. Thus, the transformed sample key frame 602' and/or the transformed sample fill frame 601' may be provided which have been accurately transformed to correspond with a desired region of interest in the current frame 71/72.

Figure 4:
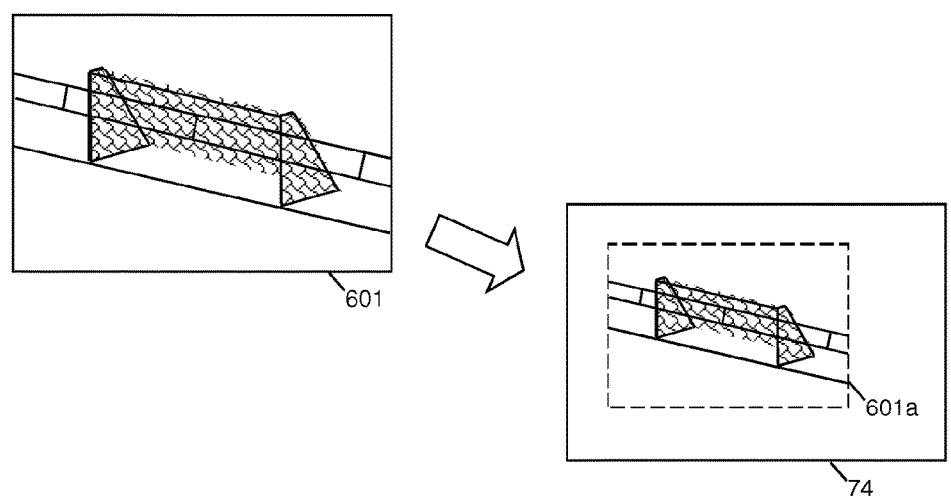
FIG. 4 is a schematic view of an example image transformation.

FIG. 4 is a schematic view of an image transformation according to one example embodiment. In this example, a current camera of interest has a static position but may pan, tilt and/or change focal length as between a sample image frame 601 and a current image frame 71. The sample image 601 shows a goal and goal net with a first resolution. The current image frame 71 shows the same scene but here the goal is shown at a second, lower resolution in a wide shot of the stadium (not shown). The sample image 601 thus corresponds to the area 601a within the current image 71. It will be appreciated that each image frame 601, 71 may correlate with a corresponding key signal frame 602, 72 as discussed above, In one example, the camera 20 may provide measurements including a focal length measurement (Z or Zoom) indicating the current focal length. An appropriate image transformation may be calculated by using the focal length measurement for the sample frames 601/602 and a focal length measurement for the current frame 71/72. Similarly, positional changes of the camera lens (Pan, Roll, Tilt) may inform corresponding image translations (i.e. the well-known PTZ or PRTZ measurements). The camera tracking may be implemented by sensors (e.g. a zoom sensor on the lens, pan and tilt sensor on the camera head/tripod), or by other appropriate methods.

Other embodiments may use other specific methods to track the relative positional relationship between the sample frames 601/602 and the current frames 71/72, and thus determine the appropriate image transformations. In one example, a direction vector may represent each of the four corners of the image within a 3D space (e.g. XYZ coordinates) from a point of origin (e.g. using a pinhole camera model). The direction vectors of the sample frame and current frame may be used to inform the respective image transformation between those two frames. For example, the pin-hole camera model and a camera projection matrix may be used to mathematically represent points of a 2D image within a 3D virtual space. These and other specific image transformations may be implemented appropriate to the environment in which the embodiments are applied, as will be apparent now to the skilled person.

The sample key frame 602 defines one or more regions which are to be enhanced. These regions may be enhanced using the respective sample fill image 601. In more detail, this process identifies certain pixel regions of the inserted alternate content 42 as defined by the sample key frame 602. The identified pixel regions may be overlaid with the appropriate pixel colour values taken from the sample fill frame 601, thereby inserting the original fine details back into the reconstructed image. In this example, the fine filaments of the goal net are overlaid onto the alternate billboard image (i.e. over the image of "COLA"), giving an improved photorealistic effect in the enhanced modified image 74.

In one example, the sample key frame 602 is applied to a composed manipulated image 73 after inserting the alternate content 42. Thus, the enhancement may be performed as a separate post-processing step.

In another example, the enhancement may be performed directly, without producing the manipulated image 73 as a separate intermediary element. That is, the sample key frame 602 may be combined with the key frame signal 72 thereby altering the manner in which the alternate content 42 is inserted into the received image 71. Thus, a combined image enhancement processing may be applied to directly produce the enhanced image 74.

This enhancement process may also consider the current key signal frame 72 which defines the target regions 14 where the alternate content 42 is to be inserted. The fine details 101 may be overlaid only in the region of the target area 14, which thereby excludes an occluding object 12. Thus, the goal net is inserted or overlaid only in the target regions of the billboard 10 and appears visually behind the goalie 12, for an improved photorealistic effect.

In one example, the key frame 602 is sufficient by itself to perform the image enhancement process. For example, a default colour (e.g. white or near-white) may be used for the overlay in the relevant area, rather than taking pixel colour values from the respective sample image 601. As another option, pixel colour values from the original frame 71 may be used as the overlay. Thus, in some embodiment, the sample image frames 601 may be ignored and/or need not be recorded in the first phase.

In one example, a graphics processing function is performed to preserve graphics components (e.g. logos, score lines or other information) within the original image which may intersect with the finely detailed features, considering the discussion above. These graphics layers should continue to be presented as a visually uppermost layer and should not be overlaid by the detailed elements or features in the enhancement process.

In one example, the camera measurement signals may be used in relation to the current image frame 71 to determine whether or not to perform the overlay image enhancement function. For example, a telemetry signal from the camera 20 may provide a focal length measurement. The focal length measurement may be used to selectively apply the overlay enhancement function only at certain desired focal lengths. For example, the goal net may only require visual enhancement in a mid-length shot and appears acceptably in close length and/or in far length shots without the overlay enhancement. Thus, the system is readily adapted to specific situations and circumstances for each scene, each venue and each event.

In one example, the image enhancement is performed using a transparency factor, thereby mixing the overlaid pixels with the underlying image. The fine details 101 are thus overlaid onto the alternate image content 42 with a transparency factor. In one example, the transparency factor may be varied. In one example, the transparency factor may be varied based on the focal length measurement. The variable transparency factor may be used for smoothly transitioning between the different modes of the overlay enhancement.

Next, a graphics mixing operation and a content substitution operation will be explained to give a further detailed understanding of the example embodiments.

Figure 5:
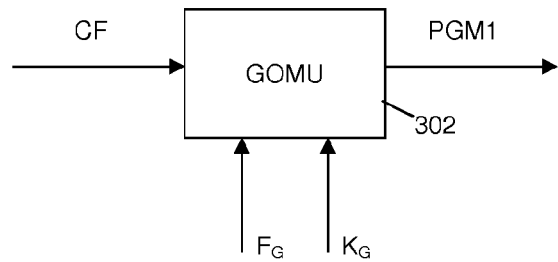
FIG. 5 is a schematic diagram showing a graphics overlay mixing operation.

FIG. 5 is a schematic diagram showing a graphics overlay mixing operation, which is suitably performed by the graphics overlay mixer unit GOMU 302 noted above, wherein a graphics overlay image signal $F_G$ is added to a video image signal CF. The mixing operation is controlled by a graphics key signal $K_G$. A program video image signal PGM1 is produced.

In this example, the incoming video image signal may take any suitable form and for convenience will be termed herein a clean feed image signal CF. The outgoing video signal PGM1 likewise may take any suitable form and is suitably called a program feed signal or a dirty feed signal (DF). The graphics overlay image signal, also called a graphics fill signal $F_G$, is mixed with the clean feed picture signal CF according to the graphics key signal $K_G$. The graphics key signal $K_G$ determines a graphics percentage of coverage (graphics %) which defines the relative transparency of the graphics fill signal $F_G$ when mixed with the clean feed picture signal CF. Thus, the graphics fill signal $F_G$ is suitably an image signal which corresponds to one or more parts, or regions, of the image area of the clean feed picture signal CF. The graphics fill signal $F_G$ is mixed with the clean feed picture signal CF in a proportion which is defined by the percentage of coverage (graphics %) in the graphics key signal $K_G$. The graphics key signal $K_G$ suitably defines the graphics percentage of coverage for each pixel, or each group of pixels, within the relevant image area which is to be modified by the graphics overlay.

The mixing operation of FIG. 5 can be expressed by the equation 1:

$$PGM = \mathrm{Mix}(CF, F_G, K_G) \tag{Eq.1}$$

These signals each suitably represent images or video image frames constructed by arrays of pixels such as a two-dimensional grid. Each additional graphics layer can thus be considered as a combination of the fill and the key components. The fill represents the visual content of the image (e.g. colour or greyscale pixel values), while the key represents the relative transparency (density) of that image layer. The key is suitably a form of numerical transparency coefficient. The terms graphics layer has been used here for convenience, but it will be appreciated that the graphics layer may contain any suitable image content. Multiple graphics layers may be applied sequentially over an original image layer or initial image layer.

Figure 6:
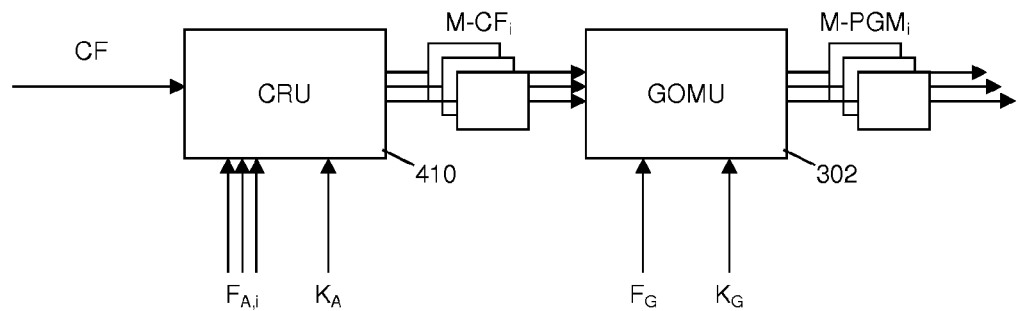
FIG. 6 is a schematic diagram showing a content substitution operation.

FIG. 6 illustrates a content substitution operation which may be performed by a content replacement unit CRU 410. An alternate image content signal $F_A$ is used to modify an incoming video signal CF according to a target area key signal $K_A$. A modified clean feed video image signal M-CF is produced. The content substitution operation may need to be repeated several times, using different alternate images $F_{A,i}$, in order to produce respective modified image signals M-CF$_1$, M-CF$_2$ . . . M-CF$_i$ where i is a positive integer. The content substitution operation may be described by the equation 2:

$$M\text{-}CF_i = \text{Mix}(CF, F_{A,i}, K_A) \quad (Eq.2)$$

Further, as shown in FIG. 6, the modified clean feed image signals M-CF$_i$ are each input to the graphics mixing operation of FIG. 5 as described above so that the one or more graphics layers may be added to each modified signal to produce a corresponding plurality of modified program signals M-PGM$_i$. The graphics mixing operation can thus be described by the equation 3:

$$M\text{-}PGM_i = \text{Mix}(M\text{-}CF_i, F_G, K_G) \quad (Eq.3)$$

Notably, the content substitution operation is typically performed at an early stage of the transmission chain where access to the clean feed image signals is available, and typically needs to be closely integrated with other equipment which produces the clean feed and which performs the graphics mixing operation. Further, each of the modified program signals M-PGM$_i$ are carried through the system, which increases the complexity and load of the transmission chain.

Figure 7:
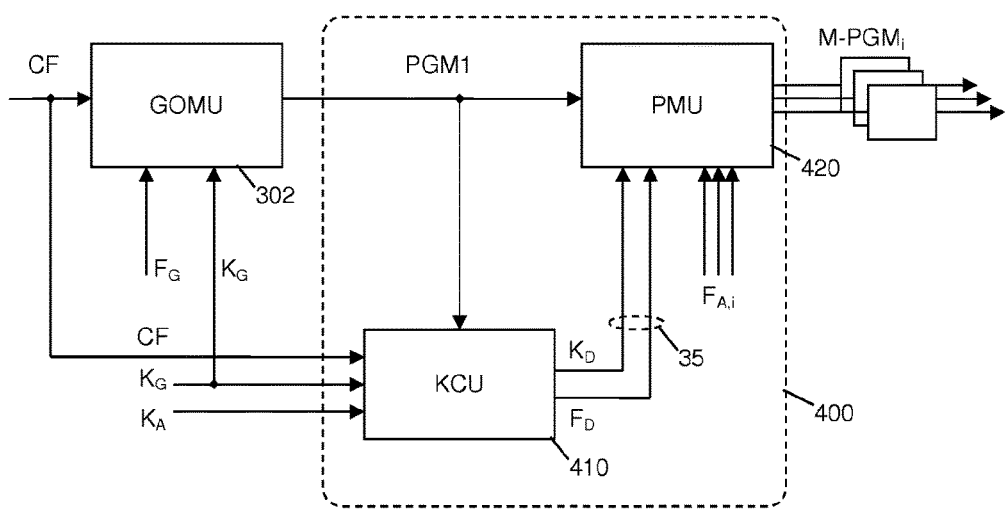
FIG. 7 is a schematic diagram showing the example system in more detail.

FIG. 7 is a schematic diagram showing an example embodiment of the system considered herein. In particular, FIG. 7 shows an example system wherein the graphics mixer 302 may operate first, followed later by a content replacement system 400.

In this example, the target area key signal $K_A$ defines a target area of the video signal which is to be modified or replaced. Typically, the non-target areas of the original video signal are to be left unaltered, while the target area key signal $K_A$ identifies those regions or portions which are to be modified. The target area key signal $K_A$ may be produced, for example, by using an infra-red detector to identify a subject in a scene shown in the video images.

In the example embodiments, the target area key signal $K_A$ is suitably defined as a numerical percentage value which will be applied to each pixel or group of pixels in the image area. For example, zero percent (0% or 0) indicates that the original image remains as originally presented, whilst one hundred percent (100% or 1) indicates that the original image is to be completely replaced at this position. Further, the target area key signal $K_A$ may define partial replacement by a percentage greater than zero and less than one hundred (e.g. 25%, 50%, 0.25, 0.5), indicating that the original image will persist proportionately at that position and thus a semi transparent replacement or modification is performed with the original image still being partially visible. For example, such semi-transparent portions are useful in transition regions at a boundary of the target area, in order to improve a visual integration of the alternate content with the original images (non-key areas).

FIG. 7 shows the example content replacement system 400 comprising a key combination unit KCU 410 and a preserving mixer unit PMU 420.

In one example embodiment, the key combination unit 410 is optionally arranged to generate a difference key signal $K_D$ and a difference fill signal $F_D$. The difference key signal $K_D$ generally represents a combination of the target area key signal $K_A$ and the graphics key signal $K_G$ as will be explained in more detail below. The difference fill signal $F_D$ generally represents differences in the image content between the first program signal PGM1 and the clean feed picture signal CF. As described above, these differences are mainly due to the addition of the graphics overlays according to the graphics fill signal $F_G$ and the graphics key signal $K_G$.

The difference fill signal $F_D$ is suitably restricted and only applies in shared areas where the target area key signal $K_A$ and the graphics key signal $K_G$ both define semi transparency. As noted above, the target area key signal $K_A$ and the graphics key signal $K_G$ are both suitably expressed as percentages. Thus, the difference fill signal $F_D$ contains image content only in these shared areas where the target area key signal $K_A$ and the graphics key signal $K_G$ are both greater than zero and less than one hundred percent.

The difference fill signal $F_D$ and the difference key signal $K_D$ may together form an intermediate signal stream or auxiliary signal stream 35. The auxiliary signal steam 35 is suitable for transmitting to a subsequent stage in a transmission chain. In example embodiments, the auxiliary signal steam 35 is suitably provided along with the first program signal PGM1. The auxiliary signal stream 35 allows the first program signal PGM1 to be modified by introducing the alternate content.

In the example embodiments, the first program signal PGM1 is modified by combining the first program signal PGM1 with the alternate content fill signal $F_A$ with reference to the difference key signal $K_D$ and the difference fill signal $F_D$ to produce a modified program signal M-PGM.

FIG. 7 also shows a further example embodiment, wherein multiple differing versions of the alternate content fill signal $F_{A1}$, $F_{A2}$, $F_{A3}$ are provided. Generically this can be considered as $F_{Ai}$ where i is a positive integer. Using the same difference fill signal $F_D$ and difference key signal $K_D$ together with the respective alternate content fill signal $F_{Ai}$, the example embodiments are able to produce many different modified program signals M-PGM$_j$.

In the example embodiments, the difference key signal $K_D$ is described by the equation 4:

$$K_D = (1 - K_G) \cdot K_A \quad (Eq.4)$$

Thus, $K_D$ is zero in all areas where $K_A$ is zero. Further, $K_D$ is zero in all areas where $K_G$ is 100 percent. Advantageously, $K_D$ contains non-zero values only for those portions of the image area where $K_G$ is less than one and $K_A$ is greater than zero, thus indicating that both $K_G$ and $K_A$ represent semi-transparent areas. The difference key signal $K_D$ thus carries meaningful information only in the area of interest and is suitable for high compression by standard image or video compression methods.

The difference fill signal $F_D$ is suitably represented by the equation 5:

$$F_D = K_D \cdot (PGM\text{-}CF) = [(1-K_G) \cdot K_A] \cdot [(PGM\text{-}CF)] \quad (Eq.5)$$

In practical embodiments, only relatively small areas, such as transitional border areas, are semi-transparent, and the area where both $K_A$ and $K_G$ are semi-transparent will be even smaller still. Thus the difference fill signal $F_D$ carries information in a relatively small area of the image and can be highly compressed by standard image compression or video compression techniques.

Some standard video formats such as SDI use eight or ten bit integer values to represent pixel values, but only a subset of the full eight or ten bit ranges are actually valid pixel values. Thus, practical implementations may consider restricting the range of outputs from the equations as described above so as to stay within the valid pixel ranges. In some practical embodiments a chroma sub-sampling scheme may be used and the method may be adapted accordingly.

Some standard video formats typically represent pixel values with unsigned values. Thus, a mapping mechanism may be employed to map to or from signed and unsigned values, such as by adding an offset to the original pixel values derived from relevant signals.

In some practical circumstances, the graphics fill signal $F_G$ and/or the graphics key signal $K_G$ may not be known or may not be supplied as an input to the system. In this situation, it is possible to perform a graphics detection stage which derives these signals, suitably based on the program signal PGM and the clean feed signal CF. That is, comparing the program signal PGM against the clean feed signal CF allows the differences between these signals to be derived, thereby obtaining at least an approximation of the added graphics layers.

It is further possible that the original clean feed signal CF is not available in some practical circumstances. In this situation, the fill difference signal $F_D$ can be derived using the graphics fill signal $F_G$ instead (which itself may be supplied, or may be derived as described above). As an example, the fill difference signal $F_D$ in this case may be described as in equation 6:

$$F_D = -K_A \cdot K_G (PGM - F_G) \quad \text{(Eq. 6)}$$

There is a problem particularly when graphics layers have already been added to an original video signal. These graphics layers may be semi-transparent and thus the original video image will still appear beneath the added graphics layers. When it is then desired to change or modify the image content in the original video signal, whilst preserving the graphics that have been added. Considering the graphics as a topmost visual layer and the original content as a bottommost layer, it is desired to change the bottommost layer whilst preserving the graphics of the topmost layer.

The example system allows those topmost graphics layers to be inserted first following existing processes, with traditional keying methods or mixing operations, such as those which may be implemented in commercial video switching and mixing equipment or image manipulation software applications. The result of those first layers in order of processing and topmost layers in order of visual appearance remains valid and relevant, independent of the additional manipulations or content replacement that have been inserted in later in time and intermediate in visual appearance between the original background image and the topmost graphics layers. This can be considered a form of 'graphics preservation'. The graphics layer (or layers) which have already been added to an image are preserved, even though another layer (i.e. the alternate content) is now added subsequently in time but at a visually intermediate position.

For simplicity, the example system has been illustrated with grey scale images or video signals. However, the skilled person can readily extend this description to colour signals in any suitable colour space such as RGB or YUV.

The described example embodiments have several important advantages. The example system is highly robust. In the event that a signal failure occurs then the first program signal PGM1 can be displayed without any modification. This preserves an acceptable viewing experience, which is important particularly for live television broadcast. In other words, the failsafe mode presents images which are still valid and relevant to the viewer without any visual disturbance.

As a further advantage, the system described herein is well adapted to be integrated with existing commercial equipment. As noted above, the first program signal PGM1 can be generated by any suitable mechanism and, in itself, this stage may be left outside the scope of the system. As a result, the system is more flexible to receive the first program signal PGM1 which may have been modified in multiple phases already. This minimises commercial and logistic constraints toward integrating the system with the existing equipment. Further, the inputs required of the system have been minimised, thus reducing the number of signals which need to be extracted from the existing equipment in order to produce the intermediate signal stream discussed above.

As a further advantage, the example system allows the alternate content to be semi-transparent, whilst preserving semi-transparency of previously added graphics overlays. This provides a richer and more appealing visual result in the modified program signals M-PGM. As a result, viewers are more likely to find the added alternate content visually appealing and integrated with the original signal. Thus, a better photo-realistic result can be achieved.

INDUSTRIAL APPLICATION

At least some embodiments of the disclosure may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the disclosure may be configured to reside on an addressable hardware storage medium and be configured to execute on one or more processors. Thus, functional elements of the disclosure may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed herein, such functional elements may be combined into fewer elements or separated into additional elements.

Although a few example embodiments have been shown and described, it will be appreciated by those skilled in the art that various changes and modifications might be made without departing from the scope of the disclosure, as defined in the appended claims.

The invention claimed is:

1. A method for use in dynamic image content manipulation, the method comprising:

storing a sample key signal frame of a key signal which defines one or more pixel regions relating to a detailed element at a first resolution;

receiving a current image frame which includes the detailed element shown at a second resolution, wherein the second resolution is lower in detail than the first resolution in relation to the detailed element;

providing a current key signal frame which defines a target area of the current image frame which is to be modified with an alternate content;

enhancing the detailed element by providing fill content in the one or more pixel regions defined by the sample key signal frame in relation to the current image frame to provide an enhanced modified image frame; and outputting the enhanced modified image frame;

wherein the method further comprises storing a sample image frame corresponding to the sample key signal frame and taking the fill content from the sample image frame in the pixel regions defined by the sample key signal frame.

2. The method of claim 1, further comprising transforming at least one region of the sample key signal frame to correspond with a respective region of the current image frame containing the detailed element.

3. The method of claim 2, wherein the transforming comprises distorting the sample key signal frame to correspond with a sub-region of the current image frame.

4. The method of claim 3, wherein the distorting provides at least one portion of the sample key signal frame as an irregular quadrilateral shape over a sub-region of the current image frame.

5. The method of claim 2, wherein the transforming is applied proportional to a relative difference between a first camera measurement signal appropriate to the current image frame and a second camera measurement signal appropriate to the sample key signal frame.

6. The method of claim 1, comprising enhancing the detailed element of the current image frame only in the target area.

7. The method of claim 1, further comprising overlaying the fill content according to a variable transparency factor.

8. The method of claim 1, further comprising selectively generating the enhanced modified image feed only at certain time portions during an image stream appropriate to the presence of the detailed element in a received image feed while not providing the enhanced modified image feed at other time portions during the image stream.

* * * * *